US009525439B2

United States Patent
Yehezkely

(10) Patent No.: US 9,525,439 B2
(45) Date of Patent: Dec. 20, 2016

(54) FULLY INTEGRATED MILLIMETER-WAVE RADIO FREQUENCY SYSTEM

(71) Applicant: QUALCOMM Incorporated, San Diego, CA (US)

(72) Inventor: Alon Yehezkely, Haifa (IL)

(73) Assignee: QUALCOMM INCORPORATED, San Diego, CA (US)

( * ) Notice: Subject to any disclaimer, the term of this patent is extended or adjusted under 35 U.S.C. 154(b) by 29 days.

(21) Appl. No.: 14/493,167

(22) Filed: Sep. 22, 2014

(65) Prior Publication Data

US 2015/0087248 A1    Mar. 26, 2015

Related U.S. Application Data

(60) Provisional application No. 61/881,111, filed on Sep. 23, 2013.

(51) Int. Cl.
| | |
|---|---|
| H04B 1/40 | (2015.01) |
| H04B 1/00 | (2006.01) |
| H04B 1/04 | (2006.01) |
| H04B 7/04 | (2006.01) |
| H04B 7/06 | (2006.01) |
| H04B 7/08 | (2006.01) |

(52) U.S. Cl.
CPC .......... *H04B 1/0067* (2013.01); *H04B 1/0007* (2013.01); *H04B 1/0483* (2013.01); *H04B 1/40* (2013.01); *H04B 7/0404* (2013.01); *H04B 7/0689* (2013.01); *H04B 7/0871* (2013.01)

(58) Field of Classification Search
CPC .... H04B 1/0067; H04B 1/0007; H04B 1/0483
USPC ........................................................ 455/84
See application file for complete search history.

(56) References Cited

U.S. PATENT DOCUMENTS

| | | | |
|---|---|---|---|
| 6,175,324 B1 | 1/2001 | Valentine et al. | |
| 8,670,322 B2 * | 3/2014 | Yehezkely | H01P 5/20 331/74 |
| 2005/0225481 A1 * | 10/2005 | Bonthron | G01S 7/032 342/175 |
| 2006/0061926 A1 * | 3/2006 | Hiraga | H01L 27/0266 361/56 |

(Continued)

OTHER PUBLICATIONS

International Search Report and Written Opinion—PCT/US2014/056972—ISA/EPO—Dec. 8, 2014.

(Continued)

*Primary Examiner* — April G Gonzalez
(74) *Attorney, Agent, or Firm* — Patterson & Sheridan, LLP

(57) ABSTRACT

Aspects of the present disclosure provide a radio frequency (RF) system that may be implemented in a variety of devices. For example, the RF system may include a plurality of first RF-modules, each configured to process RF signals received from a corresponding antenna array to generate intermediate frequency (IF) signals and to process IF signals for transmission via the antenna array, wherein the plurality of first RF modules are coupled to each other via a first interface comprising transmission lines for carrying at least an IF signal, a local oscillator (LO) signal, and a control signals; at least one second RF module; and a baseband module configured to provide IF signals, the LO signal, and the control signals to one of the first RF modules via a second interface and to provide at least IF signals to the second RF module via a third interface.

30 Claims, 6 Drawing Sheets

(56) References Cited

U.S. PATENT DOCUMENTS

| | | | |
|---|---|---|---|
| 2006/0223483 A1* | 10/2006 | Behzad | H04B 1/406 455/323 |
| 2007/0063771 A1 | 3/2007 | Pan et al. | |
| 2009/0061926 A1* | 3/2009 | Lee | H02H 9/00 361/56 |
| 2009/0284351 A1* | 11/2009 | Rossman | H04Q 5/22 |
| 2009/0284354 A1* | 11/2009 | Pinkham | G06K 7/0008 340/10.3 |
| 2009/0303124 A1* | 12/2009 | Blake | H01Q 3/267 342/368 |
| 2010/0035561 A1* | 2/2010 | Rettig | H01Q 1/22 455/73 |
| 2011/0025431 A1* | 2/2011 | Spiegel | H01Q 3/30 333/139 |
| 2011/0070900 A1* | 3/2011 | Shi | H04W 68/00 455/458 |
| 2011/0273270 A1 | 11/2011 | Brumer et al. | |
| 2012/0082068 A1* | 4/2012 | Yang | H01P 1/202 370/277 |
| 2012/0309325 A1* | 12/2012 | Carbone | H04B 1/40 455/73 |
| 2012/0309331 A1* | 12/2012 | Yehezkely | H04B 7/0689 455/101 |
| 2014/0185500 A1 | 7/2014 | Yehezkely et al. | |

OTHER PUBLICATIONS

"Method and System for 60 GHZ chipset RF Control Interface", U.S. Appl. No. 61/421,027, filed Dec. 8, 2010, US.

Niknejad A M, "Siliconization of 60 GHz", IEEE Microwave Magazine, IEEE Service Center, Piscataway, NJ, US, vol. 11, No. 1, Feb. 1, 2010, XP011300737, ISSN:1527-3342, pp. 78-85.

* cited by examiner

FULLY INTEGRATED MILLIMETER-WAVE RADIO FREQUENCY SYSTEM

CROSS-REFERENCE TO RELATED APPLICATION(S)

This application claims benefit of U.S. Provisional Patent Application Ser. No. 61/881,111, entitled "A Fully Integrated Millimeter-Wave Radio Frequency System," filed 23 Sep. 2013, and assigned to the assignee hereof, the contents of which are herein incorporated by reference and relates to U.S. patent application Ser. No. 13/312,127 filed Dec. 6, 2011, the contents of which are hereby incorporated by reference.

TECHNICAL FIELD

Aspects of the present disclosure generally relate to radio frequency (RF) systems, and more particularly to partitioning of RF system modules.

BACKGROUND

The 60 GHz band is an unlicensed band which features a large amount of bandwidth and a large worldwide overlap. The large bandwidth means that a very high volume of information can be transmitted wirelessly. As a result, multiple applications that require transmission of a large amount of data can be developed to allow wireless communication around the 60 GHz band. Examples for such applications include, but are not limited to, wireless high definition TV (HDTV), wireless docking stations, wireless Gigabit Ethernet, and many others.

In order to facilitate such applications there is a need to develop integrated circuits (ICs), such as amplifiers, mixers, radio frequency (RF) analog circuits, and active antennas that operate in the 60 GHz frequency range. An RF system typically comprises active and passive modules. The active modules (e.g., a phase-array antenna) require, control and power signals for their operation, which are not required by passive modules (e.g., filters). The various modules are fabricated and packaged as radio frequency integrated circuits (RFICs) that can be assembled on a printed circuit board (PCB). The size of an RFIC package may range from several square millimeters to a few hundred square millimeters.

In the market of consumer electronics, the design of electronic devices, and thus RF modules integrated therein, should meet the constraints of minimum cost, size, power consumption, and weight. The design of the RF modules should also take into consideration the current assembly of electronic devices, and particularly handheld devices, such as laptop and tablet computers in order to enable efficient transmission and reception of millimeter wave signals.

SUMMARY

The systems, methods, and devices of the present disclosure each have several aspects, no single one of which is solely responsible for its desirable attributes. Without limiting the scope of this disclosure as expressed by the claims, which follow, some features will now be discussed briefly. After considering this discussion, and particularly after reading the section entitled "Detailed Description," one will understand how the features of this disclosure provide advantages that include antenna diversity for wireless devices.

Certain aspects of the present disclosure provide an apparatus (e.g., an RF system). The apparatus generally includes a plurality of first RF sub-modules, each configured to process RF signals received to generate intermediate frequency (IF) signals and to process IF signals for transmission via the antenna array, wherein the plurality of first RF sub-modules are coupled to each other via a first interface comprising transmission lines for carrying at least an IF signal, a local oscillator (LO) signal, and a control signals, at least one second RF sub-module, and a baseband module configured to provide IF signals, the LO signal, and the control signals to one of the first RF sub-modules via a second interface and to provide at least IF signals to the second RF sub-module via a third interface.

Certain aspects of the present disclosure provide an apparatus for wireless communications. The apparatus generally includes a plurality of antenna arrays, a plurality of first radio frequency (RF) sub-modules, each configured to process RF signals received from a corresponding one of the antenna arrays to generate intermediate frequency (IF) signals and to process IF signals for transmission via the corresponding one of the antenna arrays, wherein the plurality of first RF sub-modules are coupled to each other via a first interface comprising transmission lines for carrying at least an IF signal, a local oscillator (LO) signal, and a control signals, at least one second RF sub-module, and a baseband module configured to provide IF signals, the LO signal, and the control signals to one of the first RF sub-modules via a second interface and to provide at least IF signals to the second RF sub-module via a third interface.

Certain aspects of the present disclosure provide an apparatus (e.g., a baseband module). The apparatus generally includes a first interface for providing intermediate frequency (IF) signals, a local oscillator (LO) signal, and control signals to a plurality of first RF sub-modules, a second interface for providing at least IF signals to a second RF sub-module, and at least one processor configured to generate the LO signal, to generate the control signals, to generate IF signals to be provided to the first RF sub-modules and second RF sub-module via the first and second interfaces, and to process IF signals received from the first RF sub-modules and second RF sub-module via the first and second interfaces.

Certain aspects of the present disclosure provide an apparatus (e.g., an RF system). The apparatus generally includes a plurality of first means for processing radio frequency (RF) signals, each first means for processing RF signals to generate first intermediate frequency (IF) signals, wherein the plurality of first means for processing RF signals are coupled to each other via a first interface comprising transmission lines for carrying at least one of an IF signal, a local oscillator (LO) signal or a control signal, at least one second means for processing RF signals, and means for processing the first IF signals, wherein the means for processing the first IF signals is configured to provide at least one of the LO signal or the control signal to one of the first means for processing the RF signals via a second interface and to process one or more second IF signals received from the second means for processing the RF signals via a third interface.

Certain aspects of the present disclosure provide an apparatus (e.g., a baseband module). The apparatus generally includes first interface means for providing first intermediate frequency (IF) signals, a local oscillator (LO) signal, and control signals to a plurality of first means for processing RF signals, second interface means for providing at least second IF signals to a second means for processing RF signals, and means for generating the LO signal, the control signals, the first IF signals to be provided to the first means for processing RF signals via the first interface means, and the second IF signals to be provided to the second means for processing RF signals via the second interface means.

BRIEF DESCRIPTION OF THE DRAWINGS

The foregoing and other objects, features, and advantages of the present disclosure will be apparent from the following detailed description taken in conjunction with the accompanying drawings.

DETAILED DESCRIPTION

Figure 1:
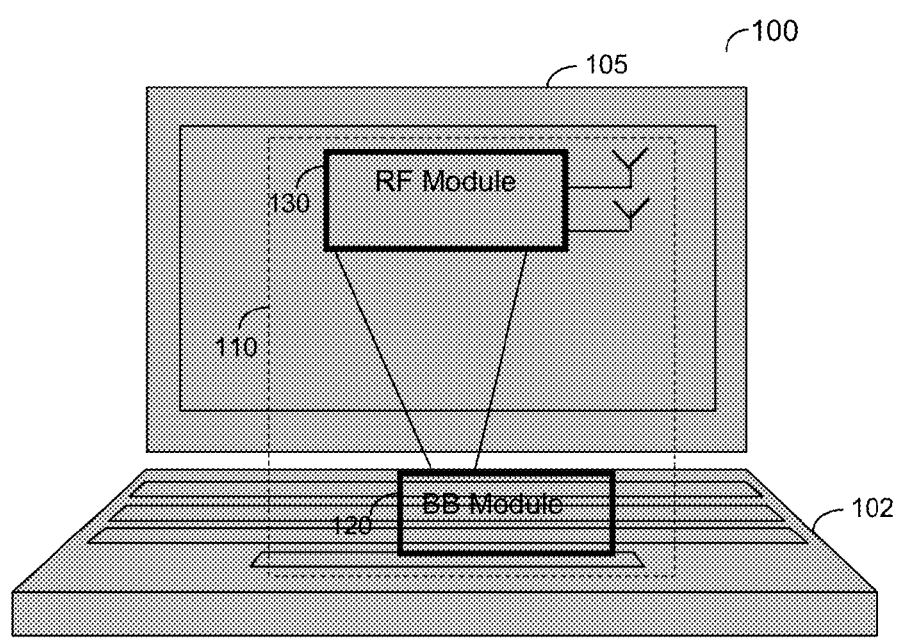
FIG. 1 is a diagram illustrating an example assembly of a laptop computer, in accordance with certain aspects of the present disclosure.

The aspects disclosed herein are only examples of the many possible advantageous uses and implementations of the innovative teachings presented herein. In general, statements made in the specification of the present application do not necessarily limit any of the various claimed aspects of the present disclosure. Moreover, some statements may apply to some inventive features but not to others. In general, unless otherwise indicated, singular elements may be in plural and vice versa with no loss of generality. In the drawings, like numerals refer to like parts through several views.

Typically, an RF system includes a baseband module and an RF module connected in the computing device, the layout of which may be based on the form factor of the device. A schematic diagram illustrating an example assembly of a laptop computer 100 that includes an RF system 110 for transmission and reception of millimeter wave signals is shown in FIG. 1. RF system 110 may include a baseband module 120 and RF module 130, which may, as illustrated, be divided between base plane 102 and lid plane 105 of laptop computer 100.

Baseband module 120 may be contained within base plane 102, and RF module 130 may be contained within lid plane 105. RF module 130 may include active transmit (TX) and receive (RX) antennas. When transmitting signals, the baseband module 120 typically provides the RF module 130 with control, local oscillator (LO), intermediate frequency (IF), and power (DC) signals. Control signals may be utilized for functions such as gain control, RX/TX switching, power level control, sensors, and detectors readouts. Specifically, beam-forming based RF systems may require high frequency beam steering operations which are performed under the control of the baseband module 120. Control signals may be generated by baseband module 120 and may be transferred between baseband module 120 and RF module 130. The power signals are DC voltage signals that power the various components of the RF module 130.

RF module 130 may be used to generate RF signals to be transmitted through an associated antenna array and process RF signals received via the associated antenna array. For transmission, RF module 130 generally performs up-conversion of IF signals to RF signals using a mixer (not shown) and transmits the RF signals through one or more TX antennae according to the control of the control signal.

In the receive direction, the RF module 130 receives RF signals (e.g., at the frequency band of 60 GHz), through one or more active RX antennae, and performs down-conversion of the received RF signals, using a mixer, to IF signals using the LO signals, and sends the IF signals to the baseband module 120. The operation of the RF module 130 may be controlled by the control signal, but certain control information (e.g., feedback signals) may be sent back to the baseband module 120.

In other computing devices where the form factor of such device does not consist of a lid and a plane, the assembly of the RF system 110 is different. For example, in a common assembly of a "flat" device (e.g., a mobile phone, a smart phone, a tablet computer, etc.), the baseband and RF module may be integrated. To improve the radio coverage, the RF system 110 may include multiple antenna arrays. That is, the RF system 110 often utilizes an antenna diversity scheme to improve the quality and reliability of the wireless link. The antenna arrays may include, for both the transmit and receive directions, multiple active antenna arrays. The active antenna arrays may be, for example, a phased array, in which each element can be controlled individually to enable the usage of beam-forming techniques.

Furthermore, there are a number of constraints that should be met when designing the RF module 130. Such constraints may necessitate that the physical dimensions, the power consumption, heat transfer, and cost should be as minimal as possible. In addition, the routing of signals between the antenna arrays to the RF circuitry should be as short as possible to reduce energy losses of RF signals.

In addition, when greater antenna diversity is required, the complexity of a design of a RF module may be significantly increased as the above-mentioned design constraints must be met.

It would be therefore advantageous to provide an RF module (e.g., a module supporting operations in the 60 GHz band), and a solution for a simple design of such a module, in an electronic device, that would efficiently support antenna diversity requirements.

Figure 2:
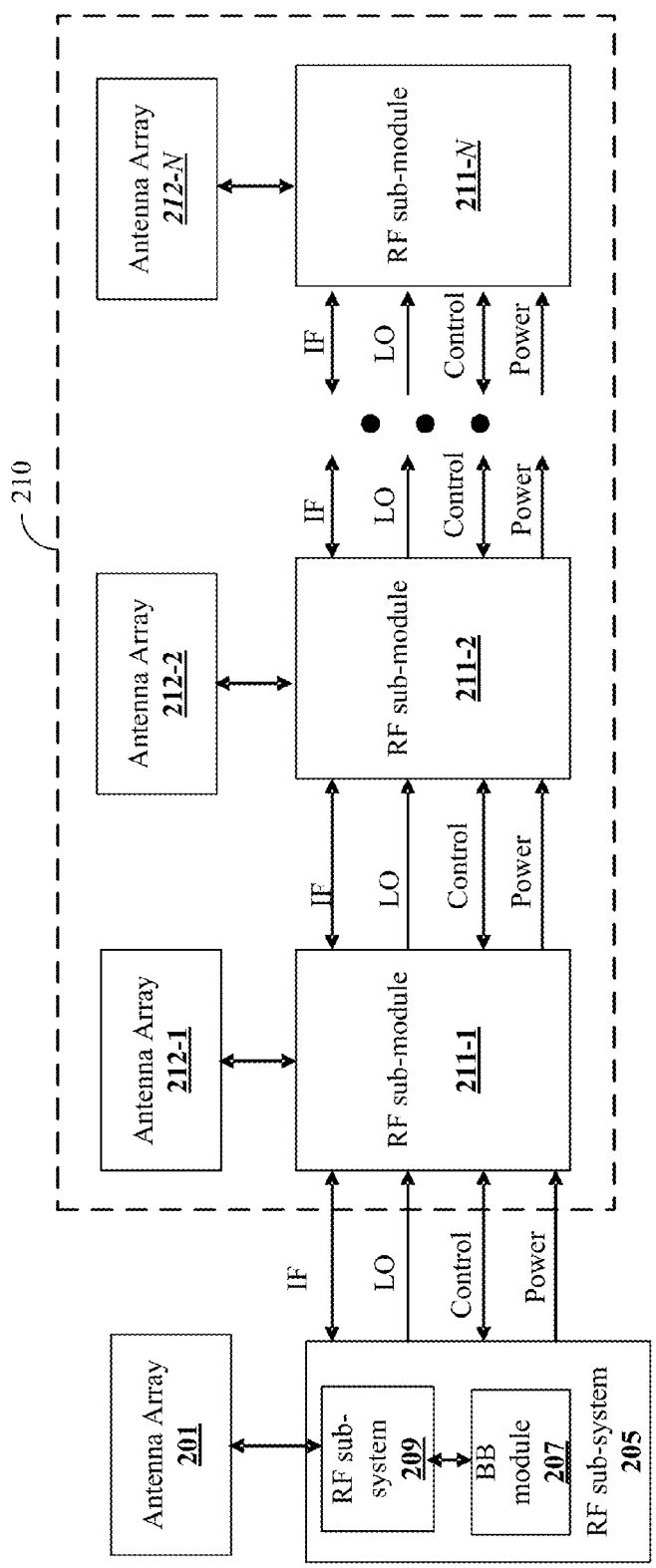
FIG. 2 illustrates a block diagram of an example RF system, in accordance with certain aspects of the present disclosure.

FIG. 2 shows a block diagram of an example RF system 200 in accordance with certain aspects of the present disclosure. The RF system 200 includes an RF sub-system 205 that is connected to a modular RF module 210 that enables the efficient transmission and reception of radio signals in at least the 60 GHz band.

The RF sub-system 205 includes a baseband module 207 and a master RF module 209. The RF sub-system 205 is also connected to an array of active antennas 201 for transmission and reception of radio signals in at least the 60 GHz band. The RF sub-system 205 can be realized as a system-on-chip (SOC) of an RF Integrated Circuit (RFIC). In some aspects, the RF sub-system 205 is fabricated on a single silicon die.

The modular RF module 210 may includes a plurality of RF sub-modules 211-1 through 211-N. Each of the RF sub-modules 211-1 through 211-N is connected to a respective antenna array 212-1 through 212-N. Each of the arrays 212-1 through 212-N may be, for example, a phased array antenna that may receive and/or transmit radio signals (e.g., at least at the 60 GHz frequency band). As demonstrated below, the solution of a modular RF module allows a simple design of a RF module that supports high antenna diversity while meeting the design constraints of RFICs.

One of the sub RF modules, e.g., sub-module 211-1, may be connected to a RF sub-system 205. RF sub-system 205 and modular RF module 210 may be positioned apart from each other and may be connected using one or more transmission lines for transferring signals between RF sub-system 205 and modular RF module 210. These signals may include, for example, at least power, control, IF, and LO signals. In some aspects, a single transmission line may transfer the signals. In some aspects, these signals can be transferred over three separate transmission lines, where the power signal is multiplexed with one of the IF, control and LO signals. In some aspects, these signals can be transferred over two separate transmission lines. For example, the LO and IF signals may be multiplexed on one line, and the control may be transmitted on the other transmission line. In some aspects, the IF and control signals may be multiplexed on one line, while the LO signal may be transferred on the other transmission line. The power signal may be multiplexed on one of the two separate transmission lines or may be provided to the sub-modules from a power source directly connected to the RF module.

Each of the plurality of RF sub-modules 211-1 through 211-N can perform the tasks including, in part, performing up and down conversions of radio signals received from or to be transmitted via the antenna arrays 212-1 through 212-N and controlling antenna arrays 212-1 through 212-N. All the RF sub-modules 211-1 through 211-N may have the same structure, and hence the same design.

In some aspects, RF sub-modules 211 may be configured as slaves, while RF module 215 in RF sub-system 205 may be configured as a master.

The first RF sub-module in the arrangement, e.g., sub-module 211-1, may be configured as a lead sub-module. The last RF sub-module in the arrangement (e.g., sub-module 211-N) may be configured as an end sub-module. All other sub-modules, e.g., sub-modules 211-2 may be intermediate sub-modules. As will be described in detail below, intermediate sub-modules transfer the IF, LO, power, and control signals to their adjacent module, while the end sub-module only receives the signals and terminates them at its output. The RF sub-modules may be hard-coded to function as a lead, an intermediate, or an end sub-module. The hard coding may be achieved, for example, by setting an external pin of the RFIC to binary HIGH or LOW.

In addition, the commands, encapsulated in the control signal, may be sent from baseband module 207 and are received by RF sub-modules 211-1 to 211-N. Each command may include a sub-module ID, and an RF sub-module executes the command only if the received sub-module ID matches the ID of the RF sub-module. For example, when requesting temperature data from the RF sub-module 211-2, all the sub-modules 211-1 to 211-N may receive the command, but only sub-module 211-2 responds thereto.

RF sub-modules 211-1 through 211-N can operate in different modes of operation, including a standalone mode, wherein only one module is included, as well as an expansion mode, and a diversity mode. Table 1 illustrates example operation modes for two RF sub-modules 211-1 and 211-2.

TABLE 1

| Operation Mode | Antenna Array Type | Sub-Module 211-1 Active | Sub-Module 211-1 Type | Sub-Module 211-2 Active | Sub-Module 211-2 Type |
|---|---|---|---|---|---|
| Expansion | 2X | Yes | Master | Yes | Slave |
| Diversity | 1X (Master or Slave) | Yes | Master | Yes | Slave |
|  | 1X | Yes | Master | No | Pending |
|  | 1X | No | Pending | Yes | Slave |
|  | 2X |  |  |  |  |

In the expansion mode of operation, the plurality of antenna arrays 212-1 through 212-N may act as a single antenna array through a single control. In the example provided in Table 1, both RF sub-modules 211-1 and 211-2 are active, with RF sub-module 211-1 acting as the master and RF sub-module 211-2 acting as a slave.

In the diversity mode, two or more RF sub-modules are activated depending on the current reception/transmission requirements. That is, the antenna arrays 212-1 through 212-N do not act as a single array. Rather each antenna array may be independently controlled. For example, as described in Table 1, at any given time, any combination of the RF sub-modules 211-1 and 211-2 and their respective arrays 212-1 and 212-2 can be active.

Baseband module 207 sets the mode of operation and controls the operation of the RF sub-modules and antenna arrays in both modes of operation. In some aspects, modular RF module 210 and RF sub-system 205 are fabricated on different substrates and connected using a transmission line (e.g., a cable). In some aspects, the RF and baseband modules may be fabricated on the same substrate and are connected using, for example, a coaxial cable or a printed transmission line on a printed circuit board.

As illustrated in FIG. 2, at least four different signals may be simultaneously transferred between RF sub-system 205 and lead RF sub-module 211-1. In addition, these signals may be routed to slave RF sub-modules 211-2 through 211-N. These signals include, but are not limited to, power, control, IF, and LO. The IF and control signals may be transferred in both directions between connected modules, while the power and LO signals may be sent unidirectionally from baseband module 207 to RF sub-modules 211-1 through 211-N. The control signal may control, for example, the switching of the TX and RX active antennas, the direction of the antenna (beam forming), and gain control. The LO signals are required for synchronization and performing of up and down conversions of high frequency signals. The IF signals are down converted signals of RF signals that are received or should be transmitted.

Figure 3:
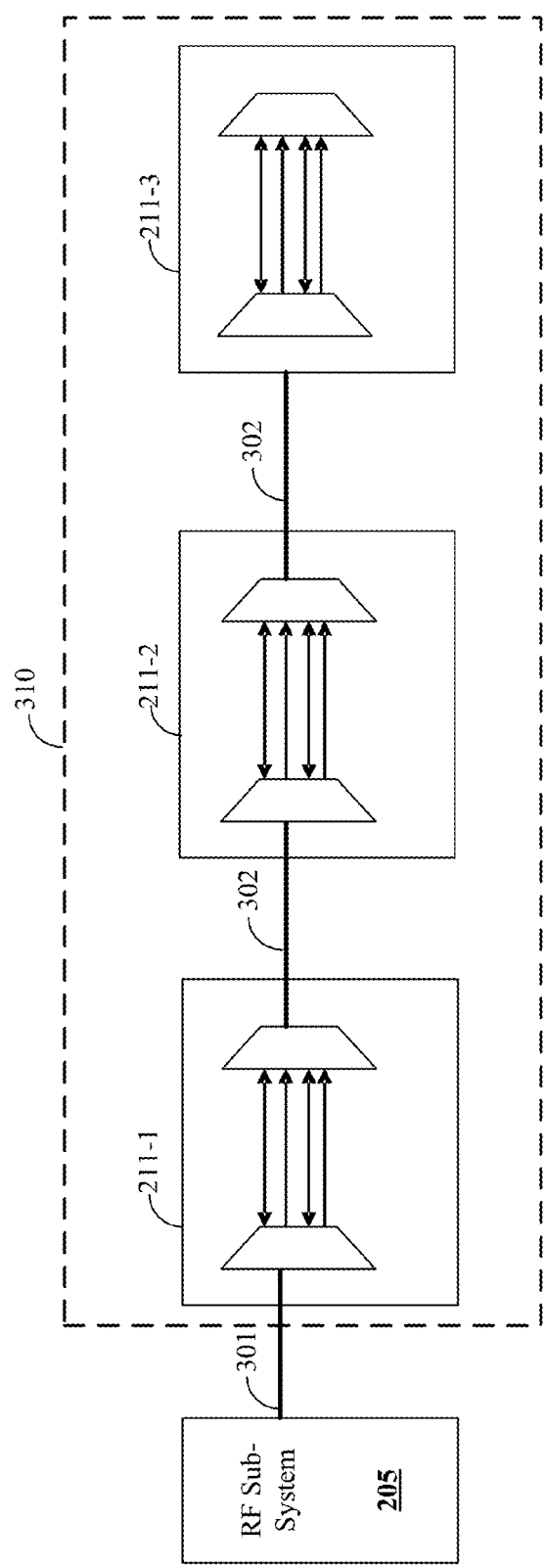
FIG. 3 illustrates an example arrangement of RF sub-modules in a modular RF module, in accordance with certain aspects of the present disclosure.

In some aspects, the LO, IF, control and power signals are transported over a single transmission line. As illustrated in FIG. 3, a first transmission line 301 connects RF sub-system 205 and lead RF sub-module 211-1. First transmission line 301 can be directly coupled between master RF module 209 and lead RF sub-module 211-1 or directly coupled between baseband module 207 and lead RF sub-module 211-1. In addition, a second transmission line 302 is chained between RF sub-modules 211-1, 211-2, and 211-3 of a modular RF module 310. As illustrated in FIG. 3, RF sub-modules 211-2 and 211-3 are respectively an intermediate slave sub-module and an end slave sub-module.

Each of the first and second transmission lines 301 and 302 may be, for example, a standard micro coaxial cable, a metal line fabricated on a multilayer substructure (e.g., on a PCB). In an aspect using micro coaxial cables as transmission lines 301 and 302, a connection between a PCB and the micro coaxial cable may be made using a micro connector.

Each signal transferred over the transmission lines 301 and 302 may have a different frequency band. With this aim, one of a set of predefined frequency plans may be utilized to enable the efficient transfer of the LO, IF, power, and control signals over a transmission line. For example, according to one plan, the frequencies of $f_{IF}$, $f_{LO}$, and $f_{CTRL}$ are set to 13-17.4 GHz, 7-8.2 GHz, 200 Mhz-1.5 GHz respectively. The frequencies $f_{LO}$, and $f_{CTRL}$ respectively represent the frequencies of the IF, LO and control signals. As another example, the frequency plan may be set as follows: the $f_{IF}$ is 13 GHz to 17.4 GHz; the $f_{LO}$ is below 1 GHz, and the $f_{CTRL}$ is 200 MHz to 1.5 GHz. In yet another example, the $f_{IF}$ is 5 GHz to 10 GHz, the $f_{LO}$ band is below 100 MHz, and the $f_{CTRL}$ is above 10 GHz. Another frequency plan that can be utilized to transfer the signals is: $f_{IF}$ is 5 GHz to 10 GHz, the $f_{LO}$ is above 15 GHz, and the $f_{CTRL}$ of the control signal is 200 MHz to 1.5 GHz.

To allow the chaining of the transmission line 302 through the plurality of RF sub-modules 211-1, 211-2, and 211-3, each RF sub-module includes a multiplexer and a demultiplexer for interleaving the signals according to a frequency plan. Master RF module 209 may also include a multiplexer and a demultiplexer for interleaving the signals according to a frequency plan, to allow a proper coupling to the lead sub-module 211-1 using the transmission line. It should be noted that the illustration of the modular RF module 310 includes only three RF sub-modules for the mere purpose of an example used for ease of understanding of the various aspects disclosed herein.

Figure 4:
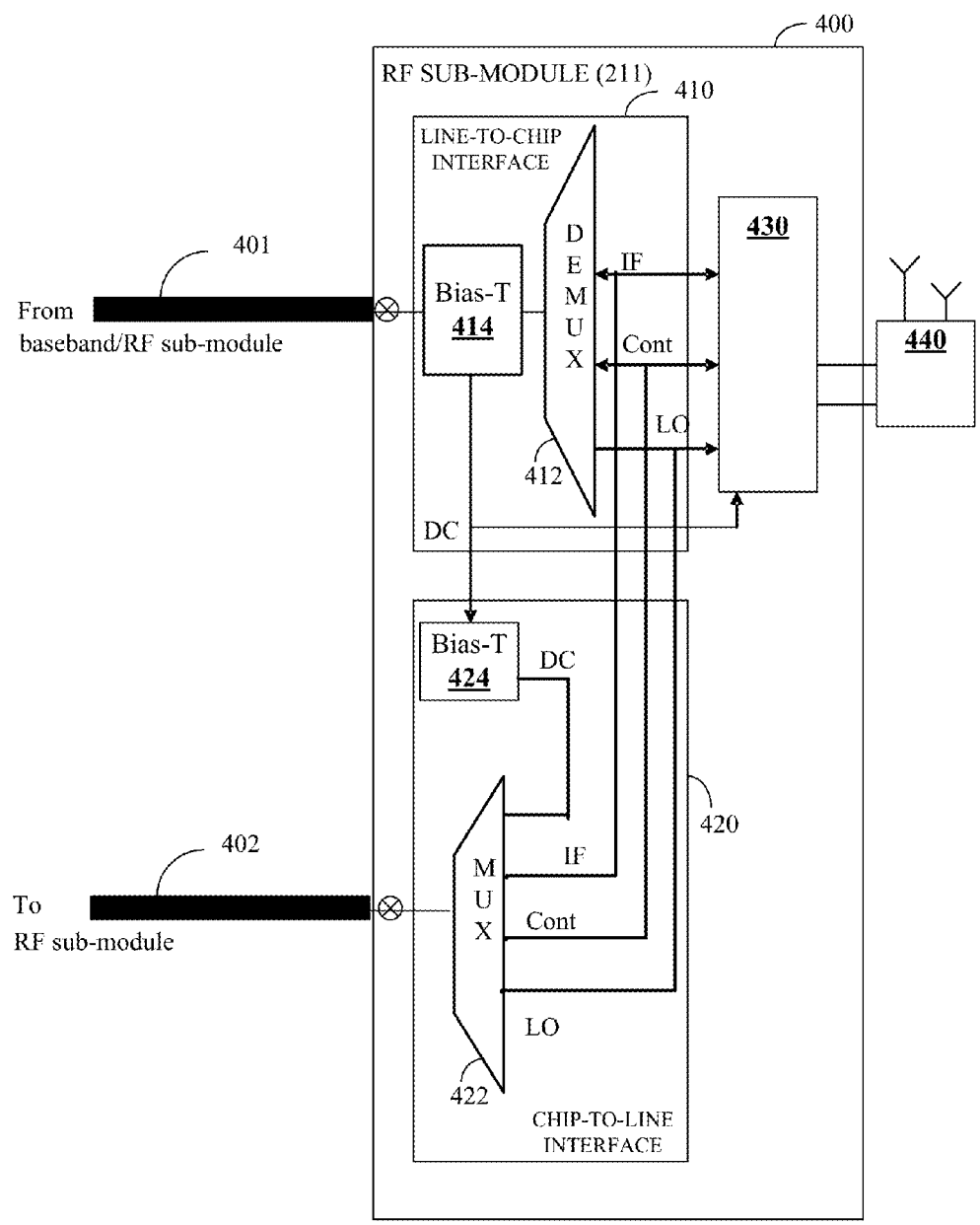
FIG. 4 illustrates an example block diagram of an RF sub-module designed, in accordance with certain aspects of the present disclosure.

FIG. 4 illustrates a block diagram of an example RF sub-module 400 (e.g., RF sub-module 211) designed according aspects of the present disclosure. As mentioned above, all the RF sub-modules that are part of the modular RF module 210 may have the same structure and design and may be configured to perform the same or similar functionality. Thus, RF sub-modules can be added to the design of a modular RF module, ad-hoc, based on a design specification (e.g., antenna diversity requirements) for a device. For example, if a vendor A requires an RF module with a diversity of four antenna arrays, then four RF sub-modules are included in the RF module design. If a vendor B requires a RF module with a diversity of two antenna arrays, then two RF sub-modules are included in the RF module design. The basic RF sub-module need not change based on antenna diversity requirements, which may allow for implementation of an RF system without the use of customized designs.

The RF sub-module 400 may include a line-to-chip interface unit 410, and a chip-to-line interface 420 respectively connected to a transmission line 401 and 402. Transmission line 401 may be input from the baseband module 220 if module 400 acts as a master, or from another RF sub-module if module 400 acts as a slave. Transmission line 402 may be connected to another RF sub-module. RF sub-module 400 may also include RF circuitry 430 connected to an antenna array 440. RF circuitry 430 performs up-conversion of IF signals for transmission via antenna array 440 and down-conversion of RF signals received via antenna array 440 and controls antenna array 440. As described above, the antenna array may be an active phased array antenna, thus the control includes steering the beam of the antenna and/or switching the antenna between active and pending states depending on the mode of operation.

During the simultaneous transfer of the LO, IF, control and power signals over each of transmission lines 401 and 402, line-to-chip interface unit 410 and chip-to-line interface unit 420 are utilized. Specifically, the line-to-chip interface unit 410 and chip-to-line interface unit 420 multiplex the various signals and impedance matches between transmission lines 401 and 402 and a PCB to which other RF sub-modules 400 are connected.

Line-to-chip interface unit 410 may include a demultiplexer (DEMUX) 412 and a Bias-T unit 414. Demultiplexer 412 demultiplexes the input signals received on transmission line 401 (either from baseband module 207 or another RF sub-module 400), to generate the control signal, IF signal, and LO signal. Bias-T unit 414 may extract a DC voltage signal to power RF circuitry 430 and antenna array 440. It should be noted that the DC voltage signal is always provided to RF circuitry 430 and antenna array 440 to enable proper operation. Demultiplexer 412 may also perform a multiplexing operation on the IF signal (results of a down conversion of the received RF signals) and control signal to be transferred over transmission line 401 back to baseband module 207, either directly or through another RF sub-system.

Chip-to-line interface unit 420 may include a multiplexer 422 and a Bias-T unit 424. Multiplexer 422 multiplexes the IF signal, LO signal, and control signal, as produced by demultiplexer 412, to be output on a single output provided to the input of Bias-T unit 424. Bias-T unit 424 may add a DC voltage signal extracted by Bias-T unit 414 and output the signal to transmission line 402. Multiplexer 422 may also performs a demultiplexing operation to produce the IF signals and control signal transferred from a different RF sub-module chained to module 400 through transmission line 402.

Bias-T units 414 and 424 may be implemented as a single unit that can extract a power signal (e.g., DC signal) from a multiplexed signal received from another RF sub-module and add a DC signal to a multiplexed signal to be transmitted to another RF sub-module.

In some aspects, line-to-chip interface unit 410, chip-to-line interface unit 420, RF circuitry 430, and Bias-T units 414 and 424 may be fabricated in a RFIC. In some aspects, line-to-chip interface unit 410, chip-to-line interface unit 420, RF circuitry 430 are fabricated in a RFIC. Bias-T units 414 and 424 may be part of a PCB, which may entail performance of DC signal multiplexing and demultiplexing over the PCB. Antenna arrays 440 may be printed on the PCB. It should be noted that if modular RF module 210 includes multiple RF sub-modules 400, then the RF module in its entirety is fabricated in a single RFIC.

In some aspects, the source of the LO signal is at one of the sub-modules, e.g., master RF sub-module 211-1. Accordingly, the LO signal may be multiplexed with the received IF signal (after down conversion) and transferred to the baseband module over the transmission line 401 and to the other sub-modules over transmission line 402.

In some aspects, multiplexer 422 separates the frequency spectrum to three different frequency bands: $f_{IF}$, $f_{LO}$, and $f_{CTRL}$ to multiplex the LO signal, IF signal, and control signal in these bands respectively. Multiplexer 422 may include a high-pass filter, a band-pass filter, and a low-pass filter, which provides for passing of signals in the $f_{IF}$, $f_{LO}$, and $f_{CTRL}$ frequency bands, respectively. The frequency bands of the filters are set according to $f_{IF}$, $f_{LO}$, and $f_{CTRL}$ as defined by the frequency plan.

Demultiplexer 412 may also include a high-pass filter, a band-pass filter, and a low-pass filter that filters the multiplexed signal received on the transition line to the IF signal, LO signal, and control signal respectively. The filtering may be performed based on the frequency bands of $f_{IF}$, $f_{LO}$, and $f_{CTRL}$ as defined by the frequency plan.

In certain aspects, an RF sub-module disclosed herein can be modeled as a library of cells and characterized by design parameters, such as size, power consumption, heat transfer, functions, and so on. The library can be loaded to a database of a computer aided design (CAD) tool, an electronic design automation (EDA) system, and the like. Thus, an IC designer, when designing a RF module, can select the library of the RF sub-module from the database to create a physical IC design layout. To the layout, as many as necessary RF sub-modules, can be added to support the antenna diversity. Typically, a cell includes patterns in a multiple of layers of the substrate arranged within a cell frame, for forming a semiconductor integrated circuit.

Figure 5:
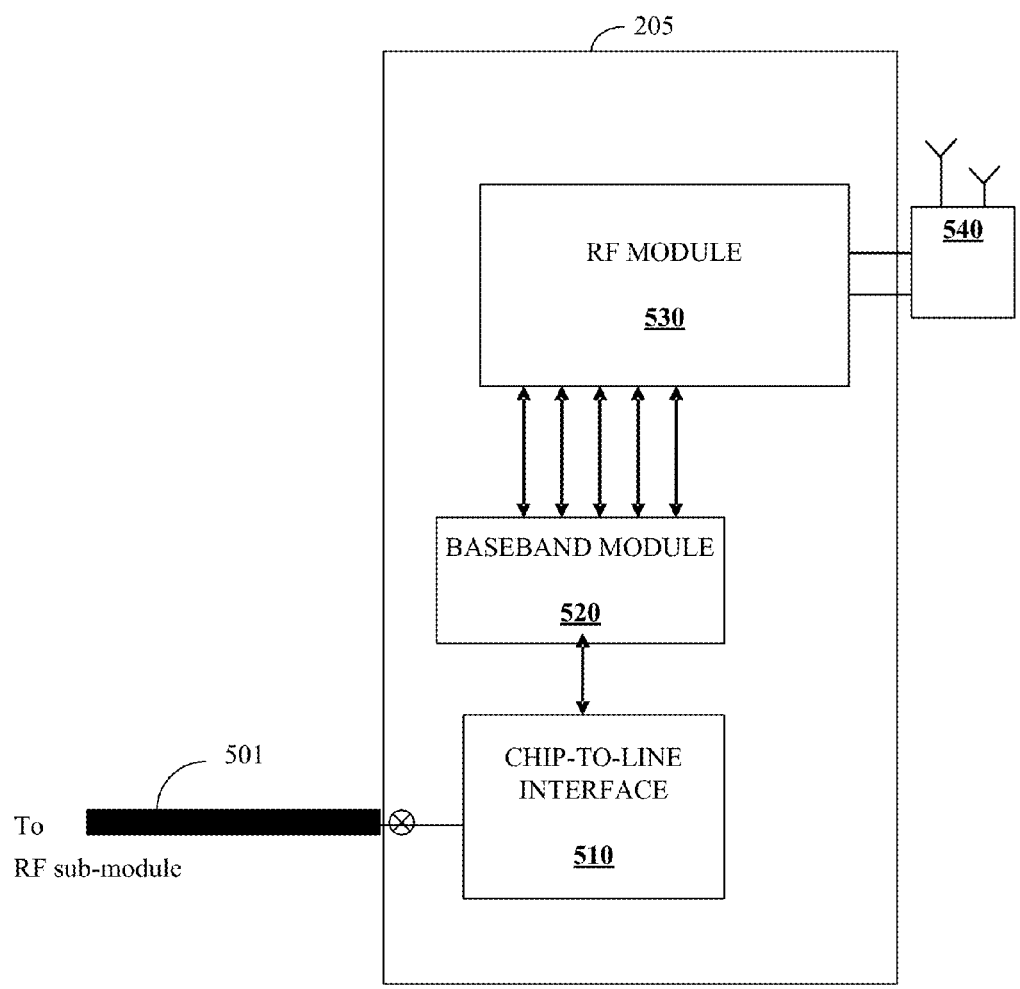
FIG. 5 illustrates an example block diagram of an RF sub-system designed, in accordance with certain aspects of the present disclosure.

FIG. 5 illustrates a block diagram of an example RF sub-system 205 designed according to one aspect. RF sub-system 205 may include a chip-to-line interface 510 respectively connected to a transmission line 501, which provides the connection to modular RF module 210. The RF sub-system 205 may also include a baseband module 520, RF module 530 connected to an antenna array 540. The RF module 530 performs up and down conversions of radio signals and controls the antenna array 540. As described above, the antenna array may be an active phased array antenna, thus the controls may include steering the beam of the antenna and/or switching the antenna between active and pending states depending on the mode of operation. In some aspects, RF module 530 may be designed as an RF sub-module 400.

Chip-to-line interface unit 510 may be configured to multiplex the various signals and impedance matches between the transmission line 501 and a PCB of the modular RF module. Chip-to-line interface unit 510 may be structured as chip-to-line interface unit 420. Baseband module 520 may generate and provide RF module 530 and RF sub-modules 211-1 through 211-N with control, local oscillator (LO), intermediate frequency (IF), and power (DC) signals.

In some aspects, chip-to-line interface unit 510, baseband module 520, and RF module 530 may be fabricated on a single RFIC or IC. In some aspects, these elements of the RF sub-system 205 may be fabricated in a RFIC. The antenna arrays 440 may be printed on a PCB or fabricated on the same multilayer substrate of the elements of RF sub-system 205.

In some aspects, RF sub-system 205 and modular RF module 210 are located at the base and lid planes of a laptop computer. RF sub-system 205 and modular RF module 210 may be assembled in the device to provide for fully functioning antenna diversity (i.e., where the active antennas are located such that optional reception/transmission of signals may be achieved).

In some aspects, RF sub-system 205 and one or more RF sub-modules 211 may be located in various positions in a device having a flat form factor. As noted above, devices having flat form factors include, but are not limited to, a smart phone, a mobile phone, a tablet computer, and the like.

Figure 6:
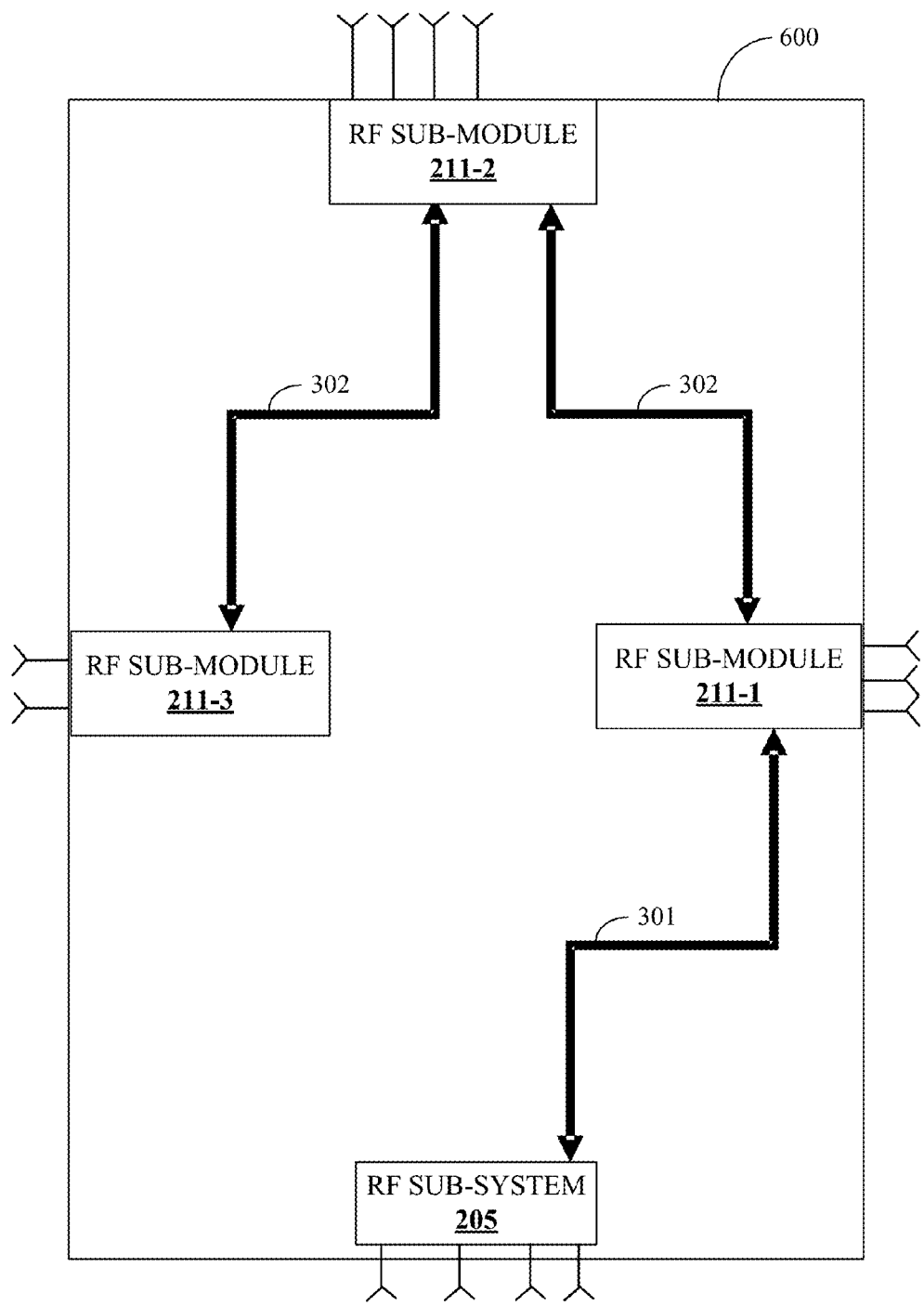
FIG. 6 illustrates an example assembly of a flat form factor device, in accordance with certain aspects of the present disclosure.

FIG. 6 illustrates an example assembly of a flat form factor device 600, such as a tablet computer, according to certain aspects of the present disclosure. RF sub-system 205 may be located at one side of the computer 600, and at least one of the RF sub-modules (e.g., sub-module 211-1) may be located at another side of the computer. Locating RF sub-system 205 and RF sub-modules 211 apart from each other may position active antennas at locations where optimal reception/transmission of signals may be achieved. To increase antenna diversity (i.e., to improve the reception and transmission of RF signals), additional sub-modules 211 can be assembled in the computer 600. For example, as illustrated, sub-modules 211-2, 211-3 are positioned at two other sides of the flat form factor device 600.

Sub-modules 211 need not be positioned in proximity to the RF sub-system 205, which may be placed near the device's fan/ventilation or in proximity to other communication channels (e.g., a PCIe bus). RF sub-system 205 and sub-module 211-1 may be connected through a single transmission line in which the control, LO, power, and IF signals are multiplexed. Sub-modules 211-1, 211-2, and 211-3 may be chained together, as discussed above.

The terms modules and sub-modules are used herein, in some cases, to indicate relative functionality of devices. For example, in some cases, a "sub-module" may refer to a type of module that is configured to perform only a subset of operations that some other module (or sub-system) is configured to perform. As an example, the RF sub-modules 211 described above may be configured to perform only a subset of operations performed by RF sub-system 205 (e.g., RF sub-modules may perform modulation/de-modulation and antenna control based on control signals generated by RF sub-system 205, while sub-system 205 includes its own RF sub-module, but also generates LO and control signals).

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules (sub-systems and sub-modules) and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the generating control signals, generating LO signals, processing IF signals, and other operations performed by baseband module 207 and processing control signals, generating or processing IF signals, and other operations performed by RF modules 209 and/or sub-modules 211 may be performed by any suitable means, including hardware, software, firmware, or any combination thereof. Similarly, means implementing the functions, such as means for processing RF signals, means for processing IF signals, and various interface means may be implemented as any suitable means, including hardware, software, firmware, or any combination thereof.

If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus, comprising:
    a plurality of first radio frequency (RF) modules, each configured to process an RF signal to generate a first intermediate frequency (IF) signal, wherein the plurality of first RF modules are coupled to each other via a first interface comprising transmission lines for carrying at least one of the first IF signal, a local oscillator (LO) signal or a control signal;
    and
    a baseband module configured to:
        process the first IF signal, the LO signal, and the control signal;
        generate a second IF signal; and
        provide the second IF signal, the LO signal, and the control signal to one of the first RF modules via a second interface.

2. The apparatus of claim 1, further comprising at least one second RF module, wherein the baseband module and the second RF module are fabricated as a single integrated circuit (IC).

3. The apparatus of claim 1, wherein the first and second RF signals comprise signals at least at a 60 GHz frequency band.

4. The apparatus of claim 1, wherein the control signal is configured to control at least one of switching of active antennas, beam forming with active antennas, or controlling gain of active antennas by one or more of the first RF modules.

5. The apparatus of claim 4, wherein the baseband module is also configured to provide at least one of the LO signal or the control signal to the second RF module via a third interface.

6. The apparatus of claim 1, wherein the plurality of the first RF modules is fabricated as a single RF integrated circuit (RFIC).

7. The apparatus of claim 1, wherein at least some of the first RF modules are configured to transfer a multiplexed signal to another one of the first RF modules.

8. The apparatus of claim 7, wherein the multiplexed signal comprises at least one of the second IF signal generated by the baseband module or the control signal.

9. The apparatus of claim 7, wherein the multiplexed signal comprises at least one of the first IF signals.

10. The apparatus of claim 1, wherein the baseband module is configured to operate the first RF modules in an operation mode comprising at least one of an expansion mode or a diversity mode, wherein in the diversity mode each first RF module is configured to independently control a respective antenna array, and in the expansion mode all of the plurality of first RF modules are configured to control a plurality of antenna arrays to act as a single antenna array.

11. The apparatus of claim 1, wherein the baseband module is configured to operate each of the first RF modules as at least one of:
    a master RF module that is configured to receive the LO and control signals from the baseband module;
    an intermediate slave RF module that is configured to transfer the LO and control signals to another RF module; or
    an end slave RF module that is configured to receive the LO and control signals from another RF module.

12. The apparatus of claim 1, further comprising:
    a plurality of antenna arrays, wherein each of the first RF modules is configured to process RF signals received from a corresponding one of the antenna arrays to generate the first IF signal.

13. The apparatus of claim 12, wherein each of the first RF modules is integrated in a single integrated circuit (IC) and the plurality of antenna arrays are printed on a printed circuit board (PCB), wherein the IC is mounted on the PCB.

14. The apparatus of claim 12, wherein:
    the baseband module is located at a first plane of the apparatus; and
    at least one of the first RF modules is located at a second plane of the apparatus.

15. The apparatus of claim 14, wherein:
    the apparatus is configured as a laptop computer;
    the first plane comprises a base plane of the laptop computer; and
    the second plane comprises a lid plane of the laptop computer.

16. The apparatus of claim 1, wherein:
    the baseband module and at least one of the first RF modules are located on different sides of a same plane of the apparatus.

17. The apparatus of claim 16, further comprising one or more antennas coupled to at least one of the plurality of first RF modules, wherein the apparatus is configured as a tablet or a mobile phone.

18. An apparatus, comprising:
    at least one processor configured to:
        generate a local oscillator (LO) signal,
        generate control signals,
        generate one or more first intermediate frequency (IF) signals to be provided to a plurality of first RF modules, and
        generate one or more second IF signals to be provided to a second RF module; and
    a first interface configured to provide the one or more first (IF) signals, the LO signal, and the control signals to the plurality of first RF modules.

19. The apparatus of claim 18, wherein the control signals are configured to control at least one of, switching of active antennas, beam forming with active antennas, or controlling gain of active antennas by one or more of the first RF modules.

20. The apparatus of claim 18, further comprising a second interface configured to provide the LO signal and the control signals to the second RF module.

21. The apparatus of claim 18, further comprising a plurality of antennas coupled to the plurality of first RF modules and the at least one second RF module, wherein the apparatus is configured as a computing device.

22. An apparatus, comprising:
    a plurality of first means for processing radio frequency (RF) signals, each first means for processing RF signals being configured to process an RF signal to generate a first intermediate frequency (IF) signal, wherein the plurality of first means for processing RF signals are coupled to each other via a first interface comprising transmission lines for carrying at least one of the first IF signal, a local oscillator (LO) signal or a control signal; and means for processing the first IF signal, the LO signal, and the control signal, wherein the means for processing the first IF signal, the LO signal, and the control signal is configured to generate a second IF signal, and provide the second IF signal, the LO signal, and the control signal to one of the first means for processing the RF signals via a second interface.

23. The apparatus of claim 22, further comprising at least one second means for processing RF signals, wherein the means for processing the first IF signal the LO signal, and the control signal and the second means for processing RF signals are fabricated as a single integrated circuit (IC).

24. The apparatus of claim 22, wherein the RF signals comprise signals at least at a 60 GHz frequency band.

25. The apparatus of claim 22, wherein the control signal is configured to control at least one of switching of active antennas, beam forming with active antennas, or controlling gain of active antennas by one or more of the first means for processing RF signals.

26. The apparatus of claim 25, wherein the means for processing the first IF signals, the LO signal, and the control signal is also configured to provide at least one of the LO signal and the control signal to the second means for processing RF signals via a third interface.

27. The apparatus of claim 22, wherein the plurality of the first means for processing RF signals is fabricated as a single RF integrated circuit (RFIC).

28. The apparatus of claim 22, wherein at least some of the first means for processing RF signals are configured to transfer a multiplexed signal to another one of the first means for processing RF signals.

29. The apparatus of claim 22, further comprising a plurality of antennas coupled to the plurality of first RF modules and the second RF module, wherein the apparatus is configured as a computing device.

30. An apparatus, comprising:
means for:
generating an LO signal,
generating control signals,
generating one or more first intermediate frequency (IF) signals to be provided to a plurality of first means for processing RF signals, and
generating one or more second IF signals to be provided to a second means for processing RF signals; and
first means for providing the first intermediate frequency (IF) signals, the LO signal, and the control signals to the plurality of first means for processing RF signals.

* * * * *